United States Patent
Hartweg et al.

(10) Patent No.: US 6,444,178 B1
(45) Date of Patent: *Sep. 3, 2002

(54) PURIFICATION DEVICE FOR GASES

(75) Inventors: Martin Hartweg, Erbach; Rolf-Dirc Roitzheim, Dornstadt; Andrea Seibold, Blaustein; Leonhard Walz, Rastatt; Thomas Fetzer, Speyer; Bernd Morsbach, Ludwigshafen, all of (DE)

(73) Assignees: DaimlerChrysler AG, Stuttgart (DE); BASF Aktiengesellschaft, Ludwigshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/487,596

(22) Filed: Jan. 19, 2000

Related U.S. Application Data

(62) Division of application No. 08/764,465, filed on Dec. 12, 1996, now Pat. No. 6,027,703.

(30) Foreign Application Priority Data

Dec. 13, 1995 (DE) .......................................... 195 46 484

(51) Int. Cl.⁷ .......................... B01D 53/56; B01D 53/62; B01J 21/00; B01J 23/00
(52) U.S. Cl. ...................... 422/177; 422/172; 422/180; 502/340; 502/341; 502/342; 502/343; 502/345; 502/346
(58) Field of Search ................. 422/171, 172, 422/177, 180; 502/341–346, 340; 423/213.2, 213.5

(56) References Cited

U.S. PATENT DOCUMENTS

| | | | | |
|---|---|---|---|---|
| 5,260,035 A | * | 11/1993 | Lachman et al. | 422/180 |
| 5,587,135 A | * | 12/1996 | Fetzer et al. | 423/239.1 |
| 5,736,114 A | * | 4/1998 | Barthe et al. | 423/213.2 |
| 5,750,460 A | * | 5/1998 | Hartweg et al. | 502/342 |

FOREIGN PATENT DOCUMENTS

| | | | |
|---|---|---|---|
| EP | 676232 | * | 10/1995 |
| FR | 94 04158 | | 3/1996 |
| JP | 61-37983 | | 8/1986 |
| JP | 6-182219 | | 7/1994 |
| JP | 7-100335 | | 4/1995 |
| JP | 7-251074 | | 10/1995 |
| JP | 7-284662 | | 10/1995 |

* cited by examiner

*Primary Examiner*—Hien Tran
(74) *Attorney, Agent, or Firm*—Crowell & Moring LLP

(57) ABSTRACT

An exhaust gas purification device includes a porous body of catalytic material of the general formula $A_a B_b O_4$ disposed in an exhaust gas stream of an engine. The porous body of catalytic material has a characteristic response temperature above which it is catalytically active to reduce pollutants in the presence of a reducing agent. The porous body stores at least 20% by volume hydrocarbons at temperatures below the response temperature. A represent at least one element selected from Mg, Ca, Mn, Fe, Ni, Co, Cu, Zn, Sn, Ti and A+B is less than 3, A is greater than 0 and B greater than 0.

10 Claims, 9 Drawing Sheets

US 6,444,178 B1

PURIFICATION DEVICE FOR GASES

This application is a division of application Ser. No. 08/764,465 filed Dec. 12, 1996 now U.S. Pat. No. 6,027,703.

BACKGROUND AND SUMMARY OF THE INVENTION

The present invention relates to a method for operating a purification device for gases, especially for exhaust gases of stoichiometrically operated gasoline engines, wherein a filter body comprising a catalyst is exposed to a gas stream to catalytically convert pollutants, as well as to a purification device for gases comprising a filter body which comprises a catalyst, particularly for stoichiometrically operated gasoline engines, wherein the filter body is disposed in the exhaust gas stream of an engine, wherein both the method and the purification device are useful in the automobile industry.

In the past, to improve the cold-running properties and, in particular, to reduce hydrocarbon emission in the exhaust gases of motor vehicles with a controlled exhaust gas catalyst, the catalyst was generally heated in the starting phase. This requires additional energy and an increased weight. Moreover, such a purification device is expensive and difficult to recycle because of the catalysts used, such as noble metals and the like.

Published German Patent 44 20 932 discloses a catalyst for an exhaust gas purification device. This catalyst is made of a spinel or a spinel-like composition and is particularly useful for gasoline engines and/or diesel engines operated on a lean mixture. Among other things, the catalyst has a high resistance to substances present in the exhaust gas. Furthermore, the catalyst acts in an oxidizing manner with carbon monoxide and hydrocarbons and in a reducing manner with $NO_x$, particularly with NO and $NO_2$.

It is an object of the present invention to improve the method as well as the purification device to improve the purifying effect during the starting phase.

According to the present invention, this and other objectives are accomplished by a method comprising the steps of at temperatures below the response temperature of the catalytic material contained in the purification device, particularly at temperatures below 200° C. and preferably at temperatures below 150° C., storing hydrocarbons present in the gas in the filter body, at temperatures above the response temperature, releasing the hydrocarbons and catalytically converting pollutants with the support material of the filter body.

The present invention furthermore relates to a purification device comprising a filter body of catalytic material which stores at least 20% by volume, preferably at least 50% by volume, of hydrocarbons at temperatures below the response temperature of the catalytic material, particularly at temperatures below 200° C., preferably below 150° C., wherein the catalytic material, with the help of a reducing agent which is preferably hydrocarbon and/or carbon monoxide, catalytically reduces pollutants.

By using a catalytically-active support material, which also acts as a storage medium for hydrocarbons at temperatures below the catalytic response temperature of the purification device, that is, at the temperature at which the catalytic reduction and/or oxidation of pollutants, particularly the catalytic reduction of $NO_x$ and the catalytic oxidation of CO takes place, it is possible to eliminate heating of the catalyst in the starting phase. Furthermore, hydrocarbons present in the exhaust gas can also be used as a reducing agent for the nitrogen oxides, especially for NO and $NO_2$, as a result of which the amount of these gases in the exhaust gas can be lowered. Moreover, because of the catalytic activity of the support material, the need for expensive catalysts, such as noble metals, rare earth metals, lanthanide, etc. can be reduced as a result of which the purification device becomes less expensive.

These and other objects, features and advantages will become more apparent from the following detailed description of presently preferred embodiments when taken in conjunction with the accompanying drawings.

DETAILED DESCRIPTION OF THE DRAWINGS

Figure 1:
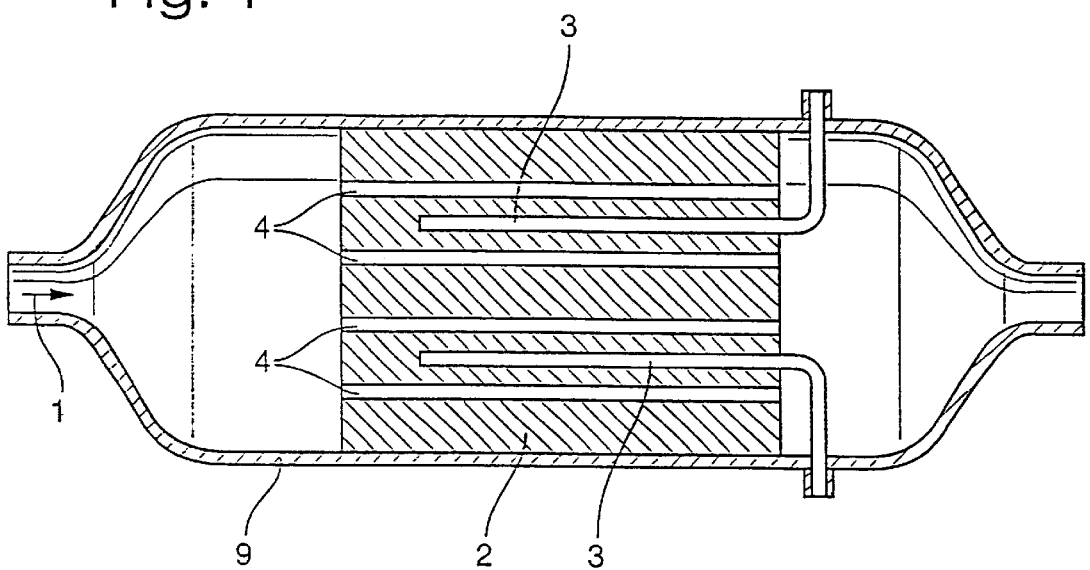
FIG. 1 shows a purification device with a porous filter body made of the catalyst and having an addition channel for a reducing agent.

FIG. 1 shows a purification device, comprising a porous filter body 2 installed in the exhaust line 9 of a gasoline engine of a passenger car, for example. The filter body 2 has flow ducts 4 through which the exhaust gas, which is to be purified, flows and which are shown here as linear ducts for clarity of illustration.

The exhaust gas which flows through the flow ducts 4, contains hydrocarbons which can function as reducing agents for nitrogen oxides which are also present in the exhaust gas, and are generally NO and $NO_2$. However, after a certain treatment point, the hydrocarbons are consumed so that the filter body 2 no longer has any catalytic effect on the pollutants.

So that a further reduction of pollutants within the filter body 2 of the purification device is possible, the filter body 2, which is made of the catalyst, has an addition duct 3 for supplying reducing agents between two flow ducts 4. The addition duct 3 is connected with the reservoir of a supplying mechanism, which is not shown. Preferably, the addition duct 3 is connected with suitable safety measures to the tank venting system of the motor vehicle, so that the vapor space of the tank forms the reservoir.

Viewed in the flow direction 1 of the exhaust gas, the blind addition duct 3 is closed off on the gas inflow side and connected with the reservoir on the gas outflow side. Ammonia and, in motor vehicles, hydrocarbons have proven to be preferred reducing agents.

To supply the reducing agent, the reducing agent enters from the gas outflow side and diffuses through the porous filter body 2, which has capillary action, into the flow ducts 4 and evaporates there. As a result, the concentration of reducing agent is increased in the exhaust gas, which has already been partially purified.

The increase in the concentration of hydrocarbons which takes place within the filter body 2, causes the pollutants remaining in the partially purified exhaust gas, to be further reduced during the flow of the exhaust gases through the filter body, as a result of which the exhaust gas is more completely purified in the purification device. The concentration of pollutants in the exhaust gas can also be decreased by lowering the concentration of carbon monoxide and/or hydrocarbons.

In order to avoid an excess amount of reducing agent, the supplying mechanism has metering equipment (not shown), such as a volumetric pump, so that the addition of reducing agent can be accurately measured.

The addition duct 3 can also extend from the outer periphery of the filter body 2, transversely to the flow direction 1 of the exhaust gas, up to the center of the filter body 2. This embodiment, which is not shown, has the advantage that, with a single addition duct 3, several flow ducts 4 can simultaneously be affected with reducing agent. Moreover, the advantage with this preferred embodiment, is that the addition duct or ducts 3 can be supplied with reducing agent in a simple manner from the direction of the outer periphery of the filter body 2.

In the case of a porous filter body 2, the supplying mechanism advantageously has nozzles, particularly in the form of a nozzle ring 6, which are disposed peripherally in the filter body 2, out of which the reducing agent can flow through the filter body 2, preferably at right angles to the direction of exhaust gas flow 1. The preferably gaseous reducing agent is also transported through the pores of the porous filter body 2 in the direction of the exhaust gas.

The reducing agent is advantageously added after a certain treatment point, which corresponds to a limit point at which the filter body 2 no longer has any catalytic effect due to consumption. The limit point corresponds to that segment, through which gas is flowing, after which, as seen in the flow direction 1, a decrease in saturation of the pollutants, particularly of the reduction of nitrogen oxide, begins in the catalyst of the filter body 2.

Figure 2:
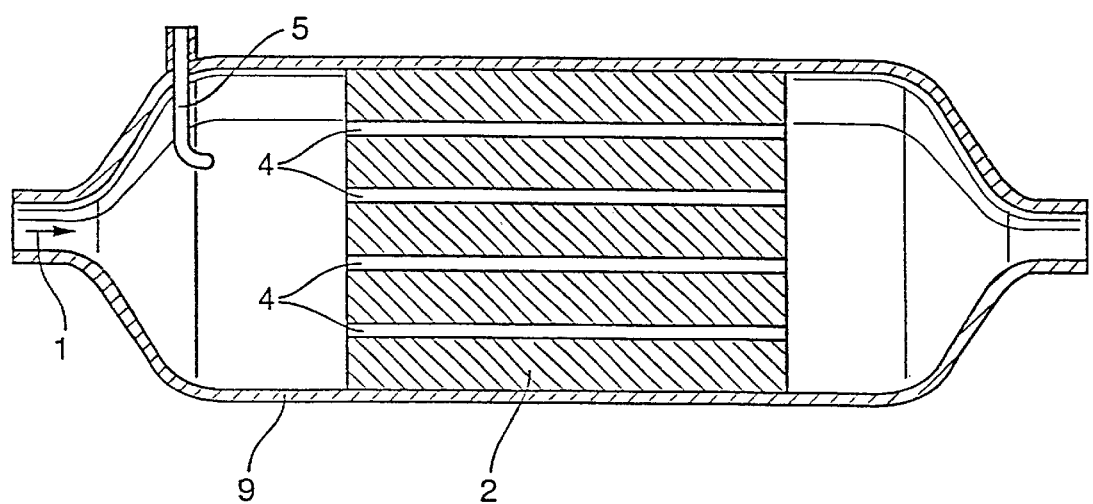
FIG. 2 shows a purification device with a mechanism to supply reducing agent, which is disposed upstream of the filter body.

In FIG. 2, another purification device is shown, in which a filter body 2 is disposed in an exhaust line 9 of an internal combustion engine, such as a gasoline engine or a gasoline engine operating on a lean mixture.

The embodiment of FIG. 2 differs from the embodiment of FIG. 1 in that the supplying mechanism comprises an atomizing nozzle 5, which is disposed upstream of the filter body 2 through which the exhaust gas flows. The atomizing nozzle 5 is provided to atomize the reducing agent and is sized so that the reducing agent is atomized in droplets of such size that a drop is completely vaporized in the filter body 2 only after it has penetrated the filter body 2 to a certain depth which preferably corresponds at least to the saturation point. This droplet size can, for example, be empirically determined. The renewed addition of reducing agent within the filter body 2 therefore takes place through evaporation of the drop within the filter body 2.

Figure 3:
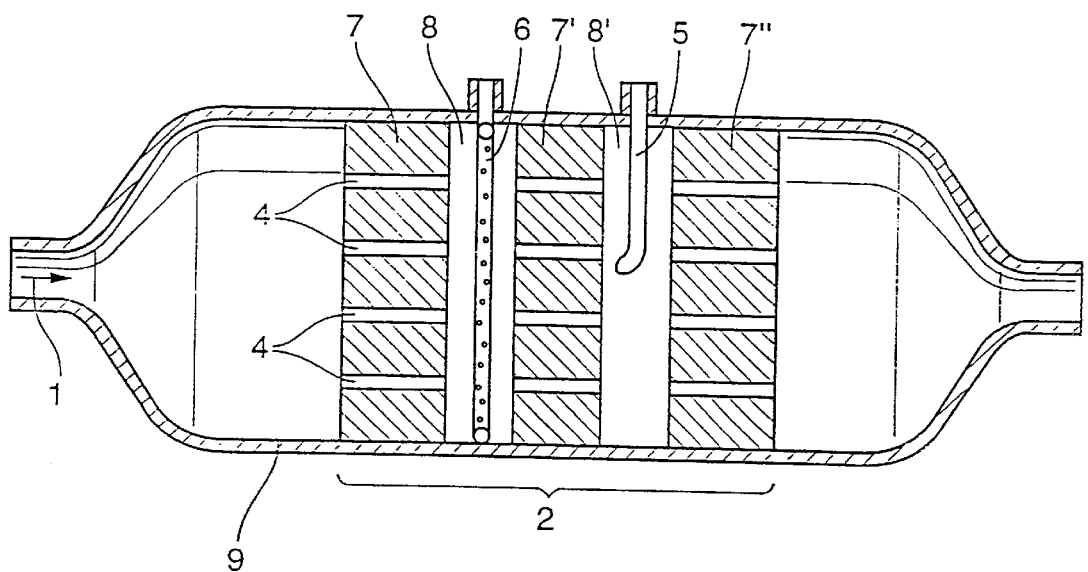
FIG. 3 shows a purification device with a mechanism with a nozzle ring for supplying the reducing agent.

A further preferred embodiment of a purification device is shown in FIG. 3. In the embodiment of FIG. 3, the filter body 2 is divided into three parts to form a filter cascade. The filter body segments 7, 7', and 7" of the porous filter body 2, through which the exhaust gas flows, are spatially separated from one another and serially disposed in the flow direction of the exhaust gas. The length of a filter body segment 7, 7', or 7", measured in the flow direction 1, appropriately corresponds to the limit point of the catalyst of the filter body 2.

In spaces 8 and 8', disposed between the partial bodies or partial body segments 7, 7', and 7" of the filter body 2, nozzles 5 and 6, which belong to the supplying mechanism, are disposed. In the first space 8, a nozzle ring 6 is disposed at the periphery from which the flow of reducing agent proceeds radially inwards. In the second space 8', a centrally disposed atomizing nozzle 5 is arranged. The reducing agent flows into the respective space 8 or 8' and mixes with the already partially purified exhaust gas. The space 8 or 8' can therefore also be regarded as a sort of mixing chamber. The exhaust gas, enriched with reducing agent in spaces 8 and 8', is then supplied to the next filter body segment 7' or 7" respectively, in order to further decrease the concentration of pollutants.

In all of the embodiments, the catalyst is preferably a spinel-containing solid. Spinels are materials of the general chemical formula $A_aB_bO_4$, which have, at least microscopically, a crystallographical or crystalline cubic lattice structure with face-centered oxygen ions with tetrahedral or octahedral gaps, in which the A particles and up to 50% of the B particles are arranged in the tetrahedral gaps and the remaining B particles are arranged in the octahedral gaps, with $a+b \leq 3$, $a>0$ and $b>0$. The term A particle or B particle refers only to the crystallographic arrangement. According to the present invention, substoichiometric compounds in which the $B_bO_3$ functions as a matrix, which have characteristic spinel lines in their X-ray spectra, and in which the spinel of the composition $A_aB_bO_4$ is present in the $B_bO_3$ matrix, so that an $A_{a(1-x)}B_bO_4$ stoichiometry results, with $a+b<3$, $a>0$, $b>0$ and $0 \leq x<1$, are also regarded as spinels. From a material point of view, the A and B particles can be different from one another.

In another embodiment, the support material of the filter body (2) comprises a catalytically active and substoichiometric composition of the general chemical formula $A_{a(1-x)}B_bO_4$ in a $B_bO_3$ matrix, in which the composition is a spinel or is spinel-like, and has characteristic spinel lines in its X-ray spectrum, with $a+b<3$, $a>0$, $b>0$ and $0 \leq x<1$.

In a preferred embodiment, the catalyst is a material of the chemical formula $A1_{a1(1-x)}A2_{a2(1-x)}B_bO_4$, in which A1 and A2 are particles of the A group, with $a1+a2+b \leq 3$, with $a1>0$, $a2>0$, $b>0$ and $0 \leq x<1$.

In another preferred embodiment, the catalyst is a material of the chemical formula $A1_{a1(1-x)}A2_{a2(1-x)}B_2O_4$, wherein A1 and A2 are particles of the A group, with the proviso that $a1+a2 \leq 1$ with $a1>0$, $a2>0$ and $0 \leq x<1$.

In a further preferred embodiment, the catalyst is a material of the chemical formula $Al_{0.5(1-x)}A2_{0.5(1-x)}B_2O_4$, with $0 \leq x < 1$.

In the spinel, the A particle is at least one element of the A group consisting of Mg, Ca, Mn, Fe, Ni, Co, Cu, Zn, Sn and Ti and the B particle is at least one element of the B group consisting of Al, Ga, In, Co, Fe, Cr, Mn, Cu, Zn, Sn, Ti and Ni. However, it should be noted that none of the elements Mn, Fe and Co, can simultaneously be an A particle and a B particle.

The following spinel-like compositions are preferred according to the present invention: $(MgCu)Al_2O_4$, $(CuCu)Al_2O_4$, $(CuZn)Al_2O_4$, $(CoZn)CuAl_2O_4$, mixtures of $(ZnCu)Al_2O_4$ with $WO_3$ and/or $V_2O_5$ and/or $TiO_2$ and particularly $Mg_{0.5}Cu_{0.5}Al_2O_4$, $Cu_{0.5}Cu_{0.5}Al_2O_4$, $Cu_{0.5}Zn_{0.5}Al_2O_4$, $Co_{0.25}Zn_{0.25}Cu_{0.5}Al_2O_4$ or their mixtures with 10% $WO_3$ and 6% $V_2O_5$ and/or 84% $TiO_2$ and/or $Al_2O_3$.

Moreover, it is preferable to provide these spinels with catalytically active elements such as palladium, platinum, rhodium, ruthenium, osmium, iridium, rhenium and/or rare earth metals such as lanthanum and cerium, vanadium, titanium, niobium, molybdenum, tungsten and/or their salts and/or their oxides.

Further preferred embodiments are shown in the following examples:

EXAMPLE 1

A copper/aluminum spinel impregnated with copper having the composition $Cu_{0.5}Cu_{0.5}Al_2O_4$, was used. The spinel was synthesized by the method disclosed in Published German Patent DE 43 01 470.

Figure 4:
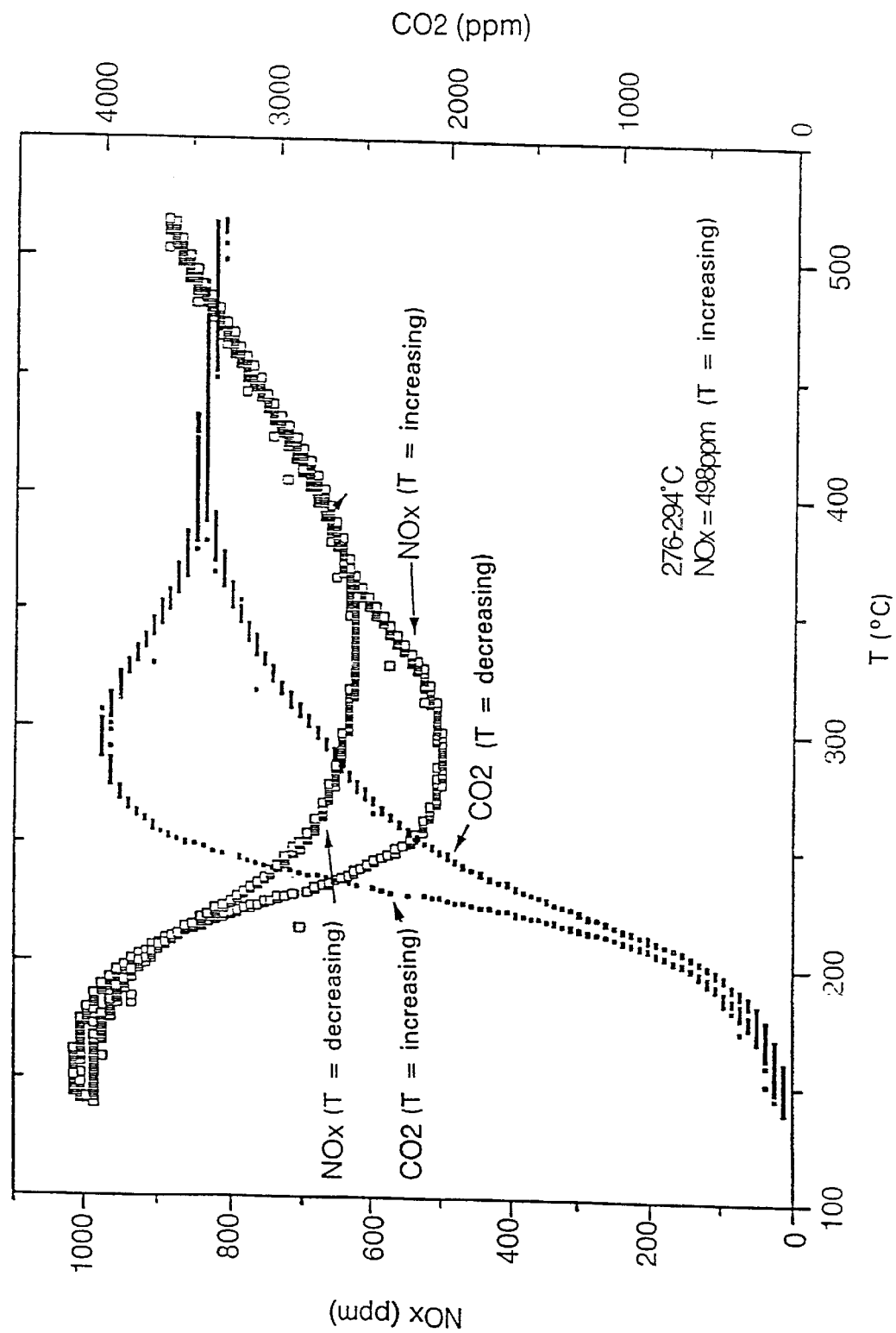
FIG. 4 is a graph of $NO_x/CO_2$ as a function of the temperature of a $CuAl_2O_4$ spinel-containing catalyst.

FIG. 4 is a graph of the $NO_x/CO_2$ concentration as a function of the temperature obtained using the copper-impregnated $CuAl_2O_4$ spinel. The measurements were taken with the temperature increasing as well as decreasing, the conversion showing a hysteresis with respect to the CO and $NO_x$.

To carry out the measurements, a 10 gram fragment of copper-impregnated $CuAl_2O_4$ spinel was transferred to a vertically oriented quartz reactor having a diameter of 20 mm and a height of approximately 500 mm, in which a gas-permeable sintered glass disk was placed in the middle to expose the sample. The height of the bed was about 15 mm. A furnace was disposed around the quartz reactor which heated the middle part of the reactor over a length of about 100 mm at temperatures of up to 550° C.

A gas mixture which consisted of 1,000 ppm NO, 1,000 ppm propene and 10% oxygen, with the remainder being argon as a carrier gas, was passed through the catalyst at a space velocity of about 10000 per hour. After the gas mixture passed through the reactor, the NO concentration was measured with a gas detector, in which any $NO_2$ present was reduced in a converter to nitric oxide NO before the measurement. Simultaneously, oxidation of hydrocarbons to carbon dioxide was observed by measuring the carbon dioxide content with the gas detector.

The result of the measurements with the spinel are shown in the graph of FIG. 4. The NO and $CO_2$ concentrations are plotted in ppm as a function of the temperature, with the $NO_x$ concentration and the $CO_2$ concentration being indicated differently, by empty squares and solid rectangles, respectively. The graph shows a clear decrease in the $NO_x$ (NO) concentration as the temperature increases. This concentration reaches a minimum between about 276° C. and 294° C. and subsequently rises again. For the copper-impregnated $CuAl_2O_4$, a drastic decrease in the $NO_x$ concentration is observed at a temperature above 200° C., the hydrocarbons being simultaneously decomposed to carbon dioxide, as shown by the increase in the $CO_2$ concentration. The temperature range at which reduction of the $NO_x$ takes place, lies between 200° C. and 400° C., depending on the composition of the material.

Similar measurement methods were used for the subsequent examples.

EXAMPLES 2

A magnesium/copper/aluminum spinel having the composition $Mg_{0.5}Cu_{0.5}Al_2O_4$, was used as the spinel. The spinel was synthesized by a method similar to the method disclosed in Published German Patent DE 43 01 470.

Figure 5:
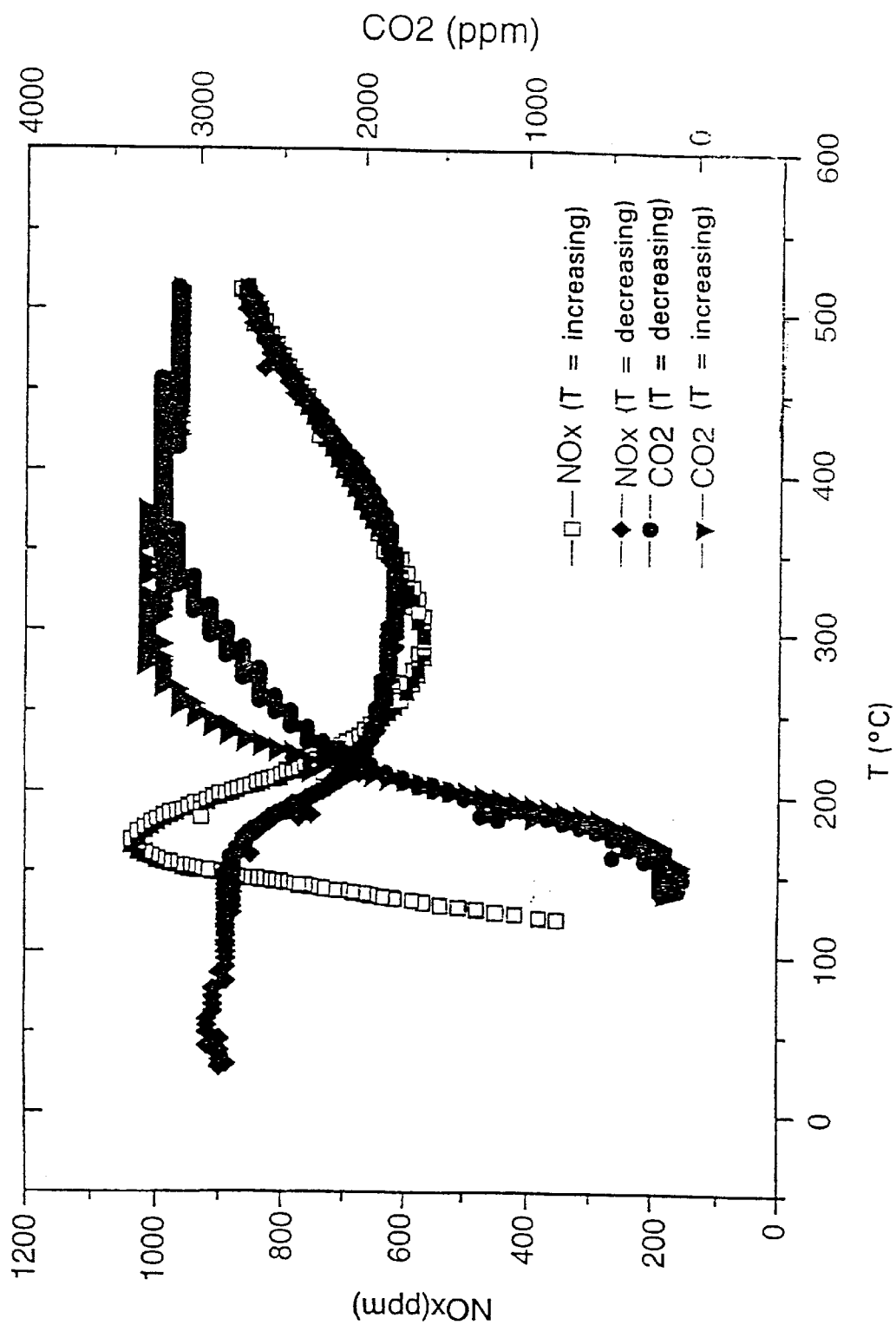
FIG. 5 is a graph of $NO_x(NO)$ reduction and CO oxidation as a function of the temperature of a $Mg_{0.5}Cu_{0.5}Al_2O_4$ spinel-containing catalyst.

The NO concentration in ppm was plotted as a function of the temperature in FIG. 5. FIG. 5 clearly shows that the NO concentration decreases with increasing temperature, a minimum being reached at about 320° C.

EXAMPLE 3

A mixture of 20% ZnO, 16% CuO and 64% $Al_2O_3$, referred to as a $ZnCuAl_2O_4$ spinel, was used in the following Examples 3 to 7. In Example 3, the spinel used was impregnated with 1.6% by weight of $CeO_2$.

Figure 6:
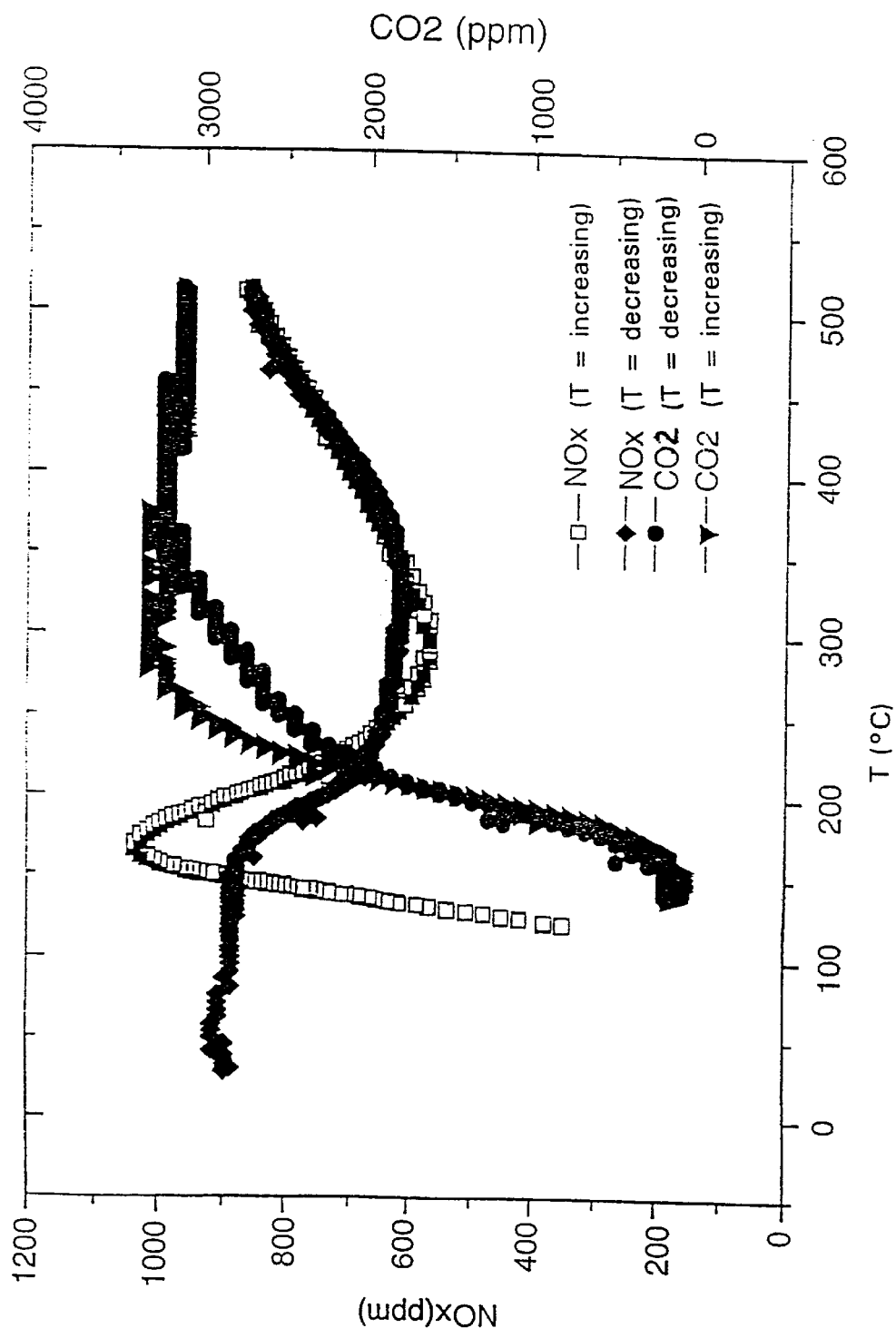
FIG. 6 is a graph of $NO_x(NO)$ reduction and CO oxidation as a function of the temperature of a catalyst which contains 20% ZnO, 16% CuO and 64% $Al_2O_3$, has a spinel structure and is additionally impregnated with 1.6% by weight of $CeO_2$.

The results of the measurements with the $ZnCuAl_2O_4$ spinel of Example 3 are shown in the graph of FIG. 6. The NO and carbon dioxide concentrations are plotted in ppm as a function of the temperature, with the $NO_x$ and carbon dioxide concentrations indicated by different symbols. The diagram clearly shows a decrease in the $NO_x$(NO) concentration as the temperature increases. This concentration reaches a minimum at about 430° C. and subsequently rises again. For the ZnCuAl2O spinel impregnated with 1.6% by weight of $CeO_2$, a drastic decrease in the $NO_x$ concentration is observed at a temperature above 150° C., hydrocarbons being simultaneously decomposed to carbon dioxide, as shown by the increase in the carbon dioxide concentration. The temperature range which shows a reduction in $NO_x$ lies between 150° C. and 500° C., depending on the composition of the material.

EXAMPLE 4

The above $ZnCuAl_2O_4$ spinel, which additionally contained 8% by weight of $CeO_2$, was used. This spinel was prepared from a $ZnCuAl_2O_4$ spinel which was impregnated with 8% by weight of $CeO_2$.

Figure 7:
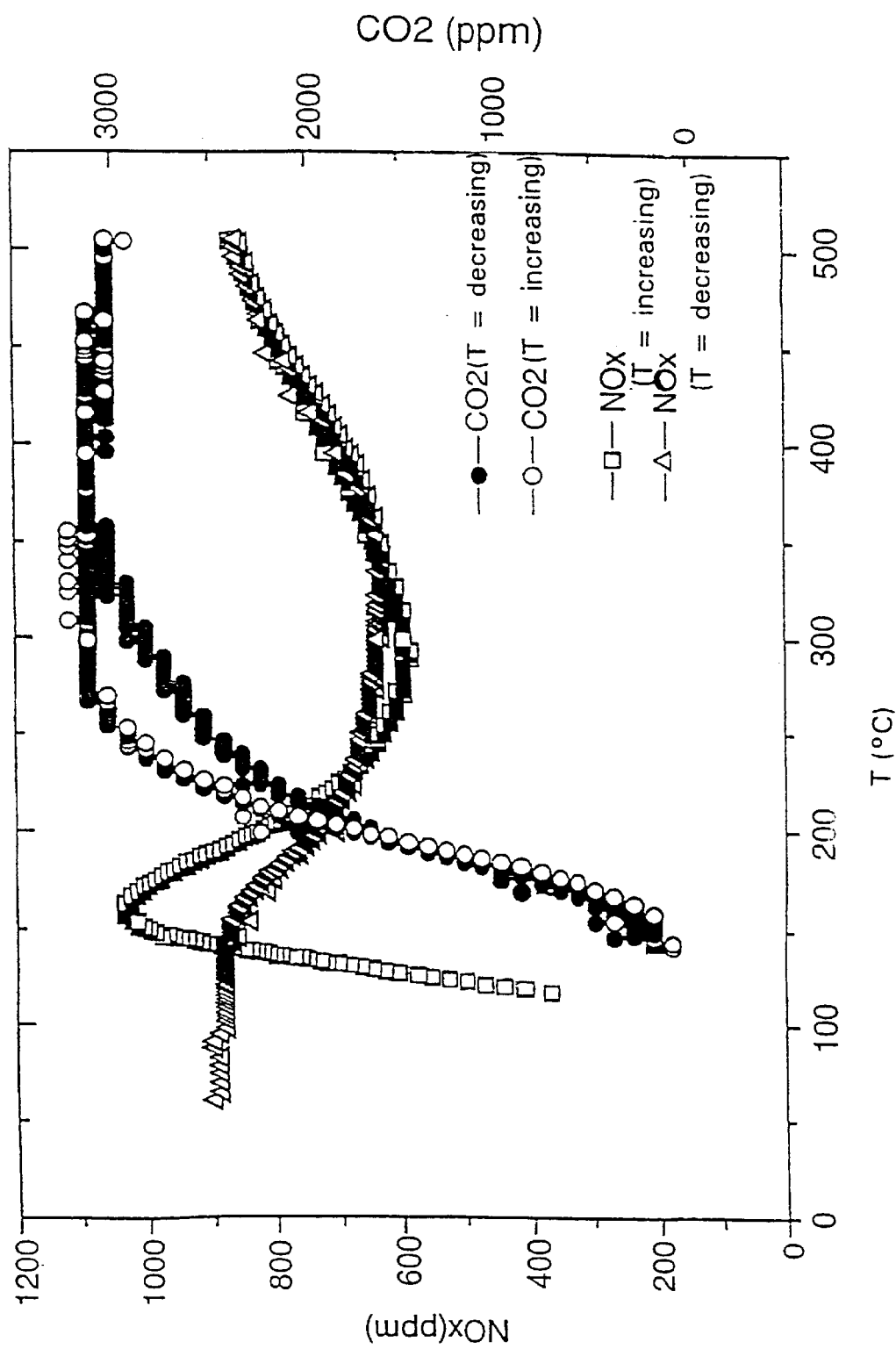
FIG. 7 is a graph of $NO_x(NO)$ reduction and CO oxidation as a function of the temperature of a catalyst which contains 20% ZnO, 16% CuO and 64% $Al_2O_3$, has a spinel structure and is additionally impregnated with 8% by weight of $CeO_2$.

The result of the measurements with the $ZnCuAl_2O_4$ spinel of Example 4, which was impregnated with 8% weight of $CeO_2$, is shown in the graph of FIG. 7. The graph in FIG. 7 shows a clear decrease in the $NO_x$(NO) concentration as the temperature increased. This concentration reaches a minimum at 300° C. and subsequently rises once again.

For the ZnCuAl2O4 spinel with 8% by weight of $CeO_2$, a drastic decrease in the $NO_x$ concentration was observed at temperatures above 200° C., with hydrocarbons simultaneously being converted to carbon dioxide, as shown by the increase in the carbon dioxide concentration. The temperature range at which there is reduction of $NO_x$, ranges from 200° C. to 500° C., depending on the composition of the material.

EXAMPLE 5

A mixture of the above-mentioned ZnCuAl2O4 spinel, with tungsten, vanadium and titanium oxides, was used as the catalytic filter material. The mixture contained 50% by weight $ZnCuAl_2O_4$ spinel, with the remaining 50% by weight of the mixture being formed by 5% by weight $WO_3$, 3% by weight $V_2O_5$ and 42% by weight $TiO_2$.

Figure 8:
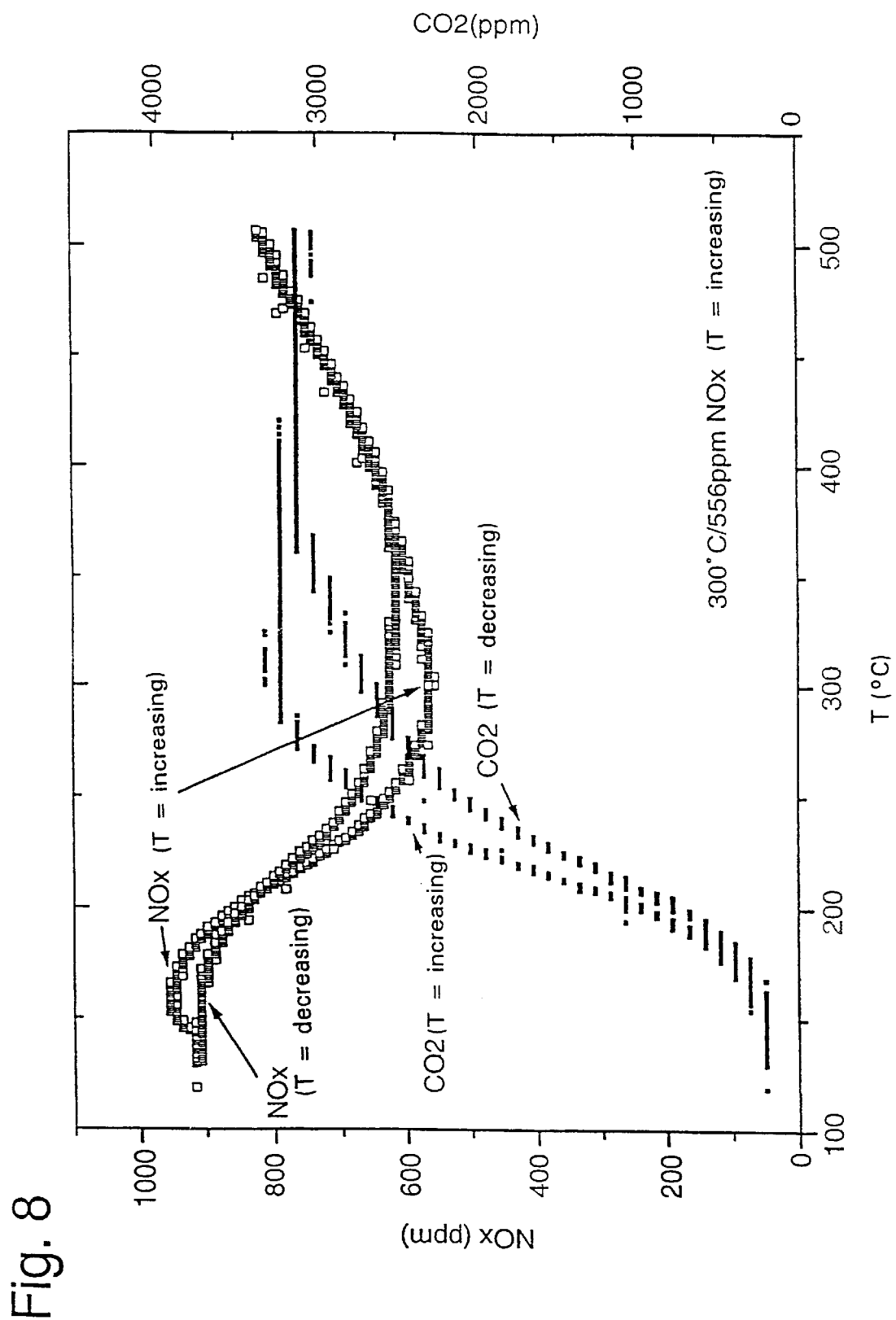
FIG. 8 is a graph of $NO_x(NO)$ reduction and CO oxidation as a function of the temperature of a catalyst which contains 20% ZnO, 16% CuO and 64% $Al_2O_3$, has a spinel structure and is additionally mixed with a solid containing $WO_3$, $V_2O_5$ and $TiO_2$.

The results of the measurements with the spinel of Example 5 are shown in the graph of FIG. 8, which indicates a clear decrease in the $NO_x(NO)$ concentration as the temperature increases. The concentration reaches a minimum at about 240° C. and subsequently rises once again.

For this mixture, a drastic decrease in the $NO_x$ concentration was observed at temperatures above 150° C., with hydrocarbons simultaneously being converted to carbon dioxide, as shown by the increase in the carbon dioxide concentration. The temperature range at which there is a reduction of $NO_x$, ranges from 150° C. to 500° C., depending on the composition of the material.

EXAMPLE 6

The ZnCuAl2O4 spinel described above, impregnated with 0.1% vanadium, was used as the catalyst material.

Figure 9:
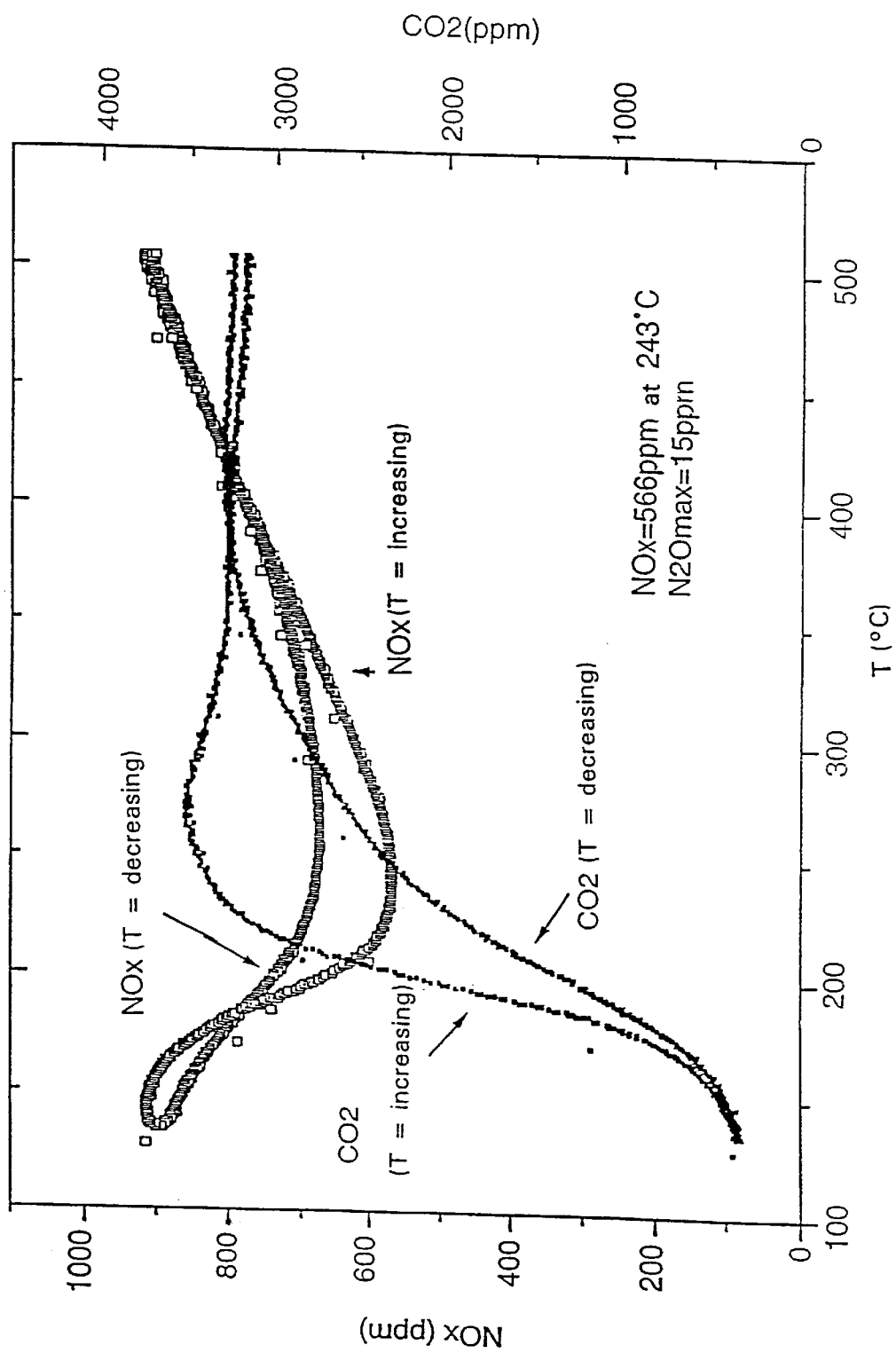
FIG. 9 is a graph of $NO_x(NO)$ reduction and CO oxidation as a function of the temperature of a catalyst which contains 20% ZnO, 16% CuO and 64% $Al_2O_3$, has a spinel structure and additionally has 0.1% by weight of vanadium.

The results of the measurements with the spinel of Example 6 are shown in the graph of FIG. 9, which shows a clear decrease in the $NO_x(NO)$ concentration as the temperature increases. The concentration reaches a minimum at about 300° C. and subsequently rises once again.

For the $ZnCuAl2O_4$ spinel with vanadium, a drastic decrease in the $NO_x$ concentration was observed at temperatures above 170° C., with hydrocarbons simultaneously being converted to carbon dioxide as shown by the increase in the carbon dioxide concentration. The temperature range at which there is a reduction of $NO_x$, ranges from 170° C. to 500° C., depending on the composition of the material.

EXAMPLE 7

The $ZnCuAl2O_4$ spinel described above, impregnated with 0.5% palladium, was used as the catalyst material.

Figure 10:
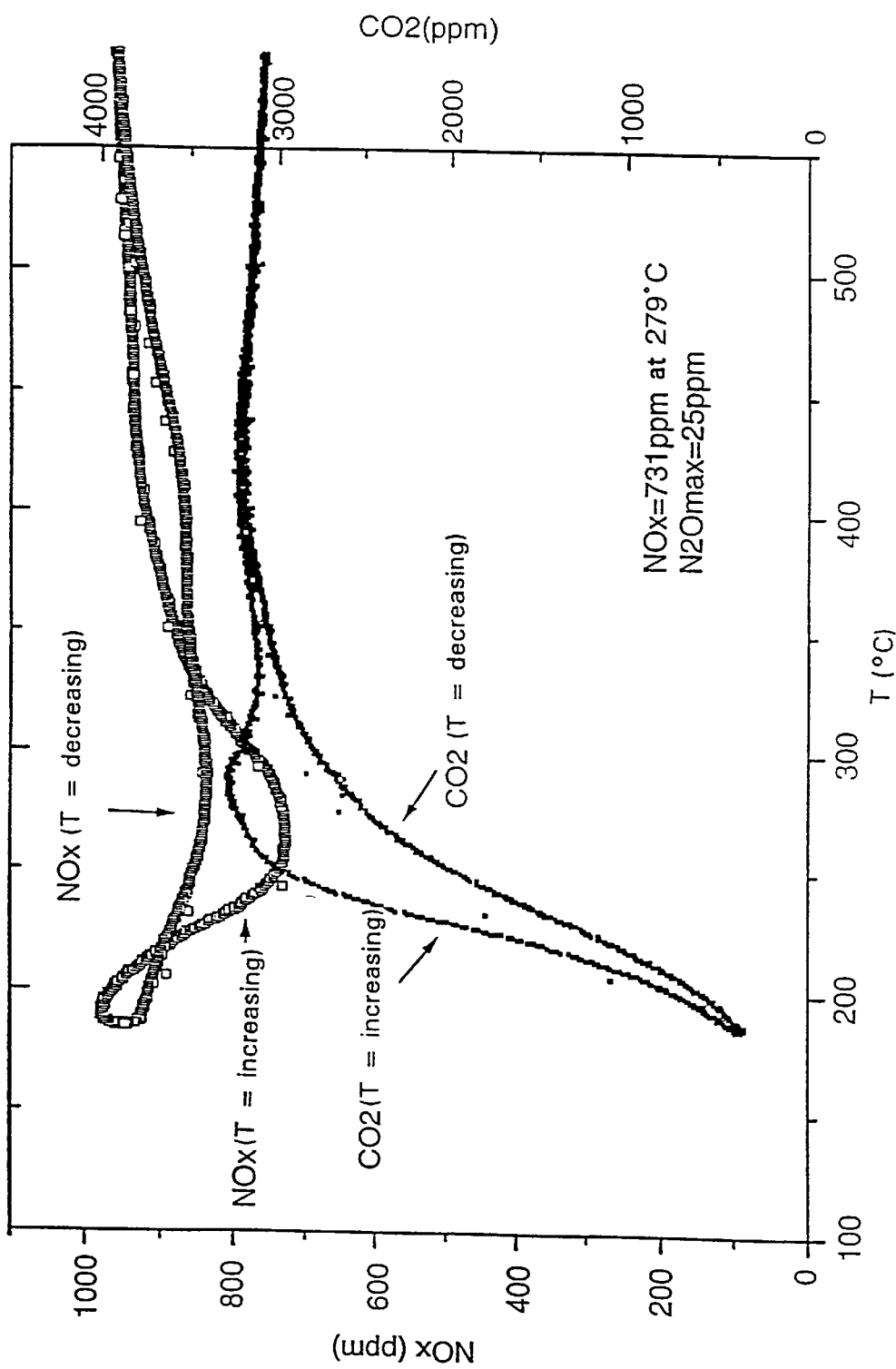
FIG. 10 is a graph of $NO_x(NO)$ reduction and CO oxidation as a function of the temperature of a catalyst which contains 20% ZnO, 16% CuO and 64% $Al_2O_3$, has a spinel structure and additionally has 0.5% by weight of palladium.

The results of the measurements with the spinel of Example 7 are shown in the graph of FIG. 10, which shows a clear decrease in the $NO_x(NO)$ concentration as the temperature increases. The concentration reaches a minimum at about 280° C. and subsequently rises once again.

For the $ZnCuAl2O_4$ spinel with 0.5% by weight of palladium, a drastic decrease in the $NO_x$ concentration was observed at a temperature above 180° C., with hydrocarbons simultaneously being converted to carbon dioxide as shown by the increase in the carbon dioxide concentration. The temperature range at which there is a reduction of $NO_x$, ranges from 180° C. to 500° C., depending on the composition of the material.

For all of the foregoing examples, the temperature range given advantageously lies approximately at the temperatures which can occur in an exhaust system of an internal combustion engine.

Since the spinels have a good response behavior at relatively low temperatures and, furthermore, exhibit good hydrocarbon storage behavior below this response temperature, they are particularly suitable for use as the support material for a three-way HC and/or CO and/or $NO_x$ exhaust gas catalyst for stoichiometrically operated internal combustion engines.

Further testing of this catalyst additionally revealed high stability in the presence of $NO_x$, $H_2O$, and $CO_2$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An engine exhaust gas purification device, comprising:
   a porous body of catalytic material disposed in an exhaust gas stream of an engine,
   wherein said porous body of catalytic material is catalytically active above 200° C. to reduce pollutants in the presence of a reducing agent, and said porous body of catalytic material stores at least 20% by volume hydrocarbons below 200° C.,
   wherein the catalytic material is a material of the chemical formula $A1_{a1(1-x)}A2_{a2(1-x)}B_bO_4$, wherein A1 and A2 are independently selected from Mg, Ca, Mn, Fe, Ni, Co, Cu, Sn and Ti, with $a1+a2+b \leq 3$, with $a1>0$, $a2>0$, $b>0$ and $0 \leq x < 1$, and B represents Al.

2. The purification device of claim 1, wherein the catalytic material has at least microscopically a crystallographic or crystalline cubic lattice structure with face-centered oxygen ions and with tetrahedral and octahedral gaps,
   wherein the at least one of A1 and A2 and up to 50% of aluminum is disposed in the tetrahedral gaps and
   wherein the remaining aluminum is disposed in the octahedral gaps.

3. The purification device of claim 1, wherein the catalytic material is a material of the chemical formula $A1_{a1(1-x)}A2_{a2(1-x)}B_2O_4$, wherein A1 and A2 are independently selected from Mg, Ca, Mn, Fe, Ni, Co, Cu, Sn and Ti, with $a1+a2 \leq 1$, $a1>0$, $a2>0$ and $0 \leq x < 1$ and B represents Al.

4. The purification device of claim 1, wherein the catalytic material is a material of the chemical formula $A1_{0.5(1-x)}A2_{0.5(1-x)}B_2O_4$, wherein A1 and $A_2$ are independently selected from Mg, Ca, Mn, Fe, Ni, Co, Cu, Sn and Ti, with $0 \leq x < 1$ and B represents Al.

5. The purification device according to claim 1, wherein the porous body of catalytic material comprises a catalyst comprising at least one catalytically active element selected from palladium, platinum, rhodium, ruthenium, osmium, iridium, rhenium lanthanum, cerium, vanadium, titanium, niobium molybdenum, tungsten, salts thereof and oxides thereof.

6. The purification device of claim 1, wherein the catalytic material stores at least 50% by volume of hydrocarbons below 200° C.

7. An engine exhaust gas purification device, comprising:
   a porous body of catalytic material disposed in an exhaust gas stream of an engine,
   wherein said porous body of catalytic material is catalytically active above 200° C. to reduce pollutants in the presence of a reducing agent, and said porous body of catalytic material stores at least 20% by volume hydrocarbons below 200° C.,
   wherein the catalytic material is selected from the group consisting of $(MgCu)Al_2O_4$, $(CuCu)Al_2O_4$, $(CuZn)Al_2O_4$, and $(CoZn)CuAl_2O_4$.

8. An engine exhaust gas purification device, comprising:
   a porous body of catalytic material disposed in an exhaust gas stream of an engine,
   wherein said porous body of catalytic material is catalytically active above 200° C. to reduce pollutants in the presence of a reducing agent, and said porous body of catalytic material stores at least 20% by volume hydrocarbons below 200° C., wherein the catalytic material is a mixture of (ZnCu)Al$_2$O$_4$ with at least one of WO$_3$, V$_2$O$_5$, or TiO$_2$.

9. An engine exhaust gas purification device, comprising:

a porous body of catalytic material disposed in an exhaust gas stream of an engine, wherein said porous body of catalytic material is catalytically active above 200° C. to reduce pollutants in the presence of a reducing agent, and said porous body of catalytic material stores at least 20% by volume hydrocarbons below 200° C., wherein the catalytic material is selected from the group consisting of Mg$_{0.5}$Cu$_{0.5}$Al$_2$O$_4$, Cu$_{0.5}$Cu$_{0.5}$Al$_2$O$_4$, Cu$_{0.5}$Zn$_{0.5}$Al$_2$O$_4$, Co$_{0.25}$Zn$_{0.25}$Cu$_{0.5}$Al$_2$O$_4$ and mixtures of these compounds with 10% WO$_3$ and at least one of 6% V$_2$O$_5$, 84% TiO$_2$, or Al$_2$O$_3$.

10. An engine exhaust gas purification device, comprising:

a porous body of catalytic material disposed in an exhaust gas stream of an engine, wherein said porous body of catalytic material is catalytically active above 150° C. to reduce pollutants in the presence of a reducing agent, and said porous body of catalytic material stores at least 20% by volume hydrocarbons below 150° C., wherein the catalytic material is a material of the chemical formula A1$_{a1(1-x)}$A2$_{a2(1-x)}$B$_b$O$_4$, wherein A1 and A2 are independently selected from Mg, Ca, Mn, Fe, Ni, Co, Cu, Sn and Ti, with a1+a2+b≦3, with a1>, a2>0, b>0 and 0≦x<1, and B represents Al.

* * * * *